US008237067B2

(12) United States Patent
Troisi et al.

(10) Patent No.: US 8,237,067 B2
(45) Date of Patent: Aug. 7, 2012

(54) CHECKWEIGHER WITH INDEPENDENT SCALES

(75) Inventors: David Andrew Troisi, Ithaca, NY (US); Daron King, Ithaca, NY (US)

(73) Assignee: Mettler-Toledo, LLC, Columbus, OH (US)

( * ) Notice: Subject to any disclaimer, the term of this patent is extended or adjusted under 35 U.S.C. 154(b) by 264 days.

(21) Appl. No.: 12/485,869

(22) Filed: Jun. 16, 2009

(65) Prior Publication Data

US 2010/0314177 A1 Dec. 16, 2010

(51) Int. Cl.
*G01G 19/00* (2006.01)
(52) U.S. Cl. ........................................ 177/145
(58) Field of Classification Search .............. 177/119, 177/145
See application file for complete search history.

(56) References Cited

U.S. PATENT DOCUMENTS

| 4,437,561 | A | * | 3/1984 | Hasegawa et al. | ............ 177/145 |
| 5,434,366 | A | | 7/1995 | Troisi | |
| 5,576,520 | A | | 11/1996 | Waterman et al. | |
| 6,084,184 | A | | 7/2000 | Troisi | |
| 6,433,288 | B1 | * | 8/2002 | Olafsson | ...................... 177/145 |
| 7,279,645 | B1 | * | 10/2007 | Inglin et al. | ................... 177/145 |
| 7,601,923 | B2 | * | 10/2009 | Lyga et al. | ................. 177/25.15 |
| 8,134,090 | B2 | * | 3/2012 | Duppre | ........................ 177/119 |

FOREIGN PATENT DOCUMENTS

DE 10010543 C1 * 9/2001

OTHER PUBLICATIONS

Machine translation of DE 10010543, Jan. 5, 2012.*

* cited by examiner

*Primary Examiner* — Randy W Gibson
(74) *Attorney, Agent, or Firm* — Standley Law Group LLP

(57) ABSTRACT

A checkweigher for the in-motion weighing of objects being transported along a conveyor line. A checkweigher of the present invention employs a plurality of scales each having its own set of weighing conveyor elements. For example, a first scale may be associated with a set of lighter weight chains to convey and weigh smaller objects, while a second scale may be associated with a set of heavier weight chains to convey and weigh larger objects. This design essentially allows the incorporation of a lightweight and heavyweight checkweigher within one common checkweigher frame. The problem of noise caused by one set of conveyor elements associated with one scale affecting the accuracy of the other scale(s) is eliminated by locating the conveying surfaces of the conveyor elements associated with the individual scales in different planes. Thus, objects transported by one weighing conveyor exert no load on the conveyor elements of the other weighing conveyor(s).

23 Claims, 6 Drawing Sheets

CHECKWEIGHER WITH INDEPENDENT SCALES

BACKGROUND OF THE INVENTIVE FIELD

The present invention is directed to a checkweigher for weighing objects moving along a conveyor. More particularly, the present invention is directed to a checkweigher with multiple scales and corresponding conveyor mechanisms for permitting the weighing of objects of different size/weight on a single checkweigher.

A checkweigher may generally be described as a high speed weighing device for the in-motion weighing of objects as the objects travel along a conveyor. A checkweigher is typically installed to a conveyor line such that an in-feed conveyor is provided for delivering objects to the checkweigher and a discharge conveyor is provided to transport objects from the checkweigher to a downstream location. The checkweigher itself also typically employs a conveyor to transport objects one at a time across a scale (weigh pan), which is essentially a vertically deflectable mechanism operable to effect weighing of the moving objects. The use of weigh pans in checkweigher would be well known to one of skill in the art and need not be described in detail herein.

The use of checkweigher to weigh moving objects is well known, and various checkweigher designs exist for this purpose. Nonetheless, checkweigher improvements have been proposed and put into operation over the years. One such improvement is described in U.S. Pat. No. 5,434,366 to Troisi, which is hereby incorporated by reference herein. This patent teaches arranging conveyor chains of a checkweigher to underengage an object to be weighed only immediately adjacent the periphery thereof. Arranging the conveyor chains in this manner minimizes the effective length of each product as seen by the checkweigher weigh pan, which permits a reduction in the length of the weigh pan and an increase in the stability of objects transported over the weigh pan. Such a design provides for a substantial increase in available settle time, as well as a reduction in conveyor speed in comparison to previously known checkweigher. In a preferred form of the invention, the length of the weigh pan employed may be reduced to be essentially equal to, and preferably equal to, the diameter of the objects to be weighed, thereby ensuring that only one container can be supported by the weigh pan during a weighing operation.

It is often desirable to convey objects of different size (e.g., diameter) over a single checkweigher. In certain checkweigher, this means providing a set of fixed width conveying elements (e.g., conveyor chains and tracks) that can support objects of different diameter. According to the improved checkweigher of U.S. Pat. No. 5,434,366, the conveyor chains are moveable such that their centerlines may be relocated to approximately the peripheral edges of a particular object to be weighed. Additional tracks are also provided to support the conveyor chains at the various positions necessary to support objects of various diameter. This allows for the above-described advantages even with objects of different size.

While a checkweigher of U.S. Pat. No. 5,434,366 provides for improved results when weighing objects of different diameter, weighing such dissimilar objects on any known checkweigher is still problematic. Particularly, it is an understood principal of checkweigher design that the best possible accuracy is achieved by using conveyor chains of the lightest possible weight. This stems from the fact that lighter weigh chain typically has a smaller pitch, which creates less noise as it travels across the weigh pan and, therefore, has less of an effect on weighing accuracy.

It is also understood that checkweigher conveyor chain size must be relatively matched to the size of the objects that will be transported thereon. That is, heavy objects require heavier chain. Past experience shows that attempting to run heavier objects on lightweight chain to improve weighing accuracy causes unacceptable, premature chain and runner (track) wear, even if the number of conveyor chains is increased (e.g., 4 chains are used instead of 2). Consequently, the use of multiple checkweighers is the solution typically employed when it is required to weigh both large and small objects on a single conveyor line. For example, two checkweighers may be associated with the same conveyor line: one checkweigher provided with lightweight chains for processing the smaller objects, and the other checkweigher provided with heavier weight chains for processing the larger objects. Objects to be weighed are then diverted to the appropriate checkweigher as they are conveyed. Unfortunately, this solution is not always feasible due to space constraints associated with a given conveyor line. Further, purchasing and installing two separate checkweighers can be quite expensive.

SUMMARY OF THE GENERAL INVENTIVE CONCEPT

A checkweigher of the present invention overcomes the aforementioned problems. Particularly, a single checkweigher of the present invention may be used to weigh in-motion objects of various size (e.g., diameter) and weight while simultaneously allowing the use of conveyor elements of a size suited to the objects conveyed thereby.

To this end, a checkweigher of the present invention employs a plurality of scales each having its own set of conveyor elements (e.g., conveyor chains). For example, a first scale may be associated with a set of lighter weight chains to convey and weigh smaller objects, while a second scale may be associated with a set of heavier weight chains to convey and weigh larger objects. This design essentially allows the incorporation of a lightweight and heavyweight checkweigher within one common checkweigher frame, thus saving valuable line space and reducing costs. Preferably, but not essentially, each scale has more than one conveyor track so that the conveyor chain centerlines of each scale may be adjusted to accommodate objects of varying size (e.g., diameter) within a range of sizes, as is described U.S. Pat. No. 5,434,366.

Simultaneously operating two sets of conveyor elements of different weight/size would normally increase noise and decrease weighing accuracy. As such, if two sets of such conveyor elements were located on a checkweigher having a single scale, typical practice would demand that the unused set of conveyor chains be removed from the associated conveyor tracks to reduce noise during checkweigher operation. A checkweigher of the present invention eliminates this problem by employing two or more separate scales, wherein noise caused by a set of conveyor chains associated with one scale will not affect the accuracy of the other scale(s).

As can be better understood from the description of exemplary embodiments appearing below and from the associated drawing figures, a checkweigher of the present invention generally includes one or more sets of heavier weight conveyor chains that are located outside of one or more sets of lighter weight conveyor chains. Thus, when processing objects of smaller size, the outwardly located heavier weight conveyor chains do not support a load. Since there is no weight on the heavier weight conveyor chains, there is minimal wear associated with running these conveyor chains while simultaneously running the lighter weight conveyor chains and weighing the smaller objects. Therefore, the heavier weight chains need not be removed as would typically be required. Nonetheless, an electromechanical clutch or similar device could still be provided to separate the conveyor drives such that operation of the heavier weight conveyor chains may be disabled when weighing the smaller objects.

When weighing larger objects, it can be understood that both the heavier weight conveyor chains and the lighter weight conveyor chains would normally be contacted by the objects being weighed if the conveying surfaces of both sets of conveyor chains reside in the same plane. As discussed above, this would have an undesirable effect on the lighter weight conveyor chains. To overcome this potential problem, the conveying surfaces of the conveyor chains associated with the scales of a checkweigher of the present invention are located in different planes.

In one embodiment, a separate track may be provided for the smaller objects such that the lighter weight conveyor chains reside at a lower height than the associated in-feed and discharge conveyors, as well as the heavier weight conveyor chains. Consequently, objects residing on the conveying surfaces of the heavier weight conveyor chains will pass over the conveying surfaces of the lighter weight conveyor chains without contact therewith and, thus, no load is applied to the lighter weight conveyor chains by the larger objects.

In an alternate embodiment, the heavy weight conveyor chains and their associated chain runners are caused to ramp vertically upward to a position where the conveying surfaces thereof reside in a plane that is above that of the conveying surfaces of the lighter weight conveyor chains. Consequently, objects residing on the conveying surfaces of the heavier weight conveyor chains will again pass over the conveying surfaces of the lighter weight conveyor chains without contact therewith and, thus, no load is applied to the lighter weight conveyor chains by the larger objects. As mentioned with respect to weighing of smaller objects above, an electromechanical clutch or similar device can also be provided to disable operation of the light weight conveyor chains when weighing the larger objects.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
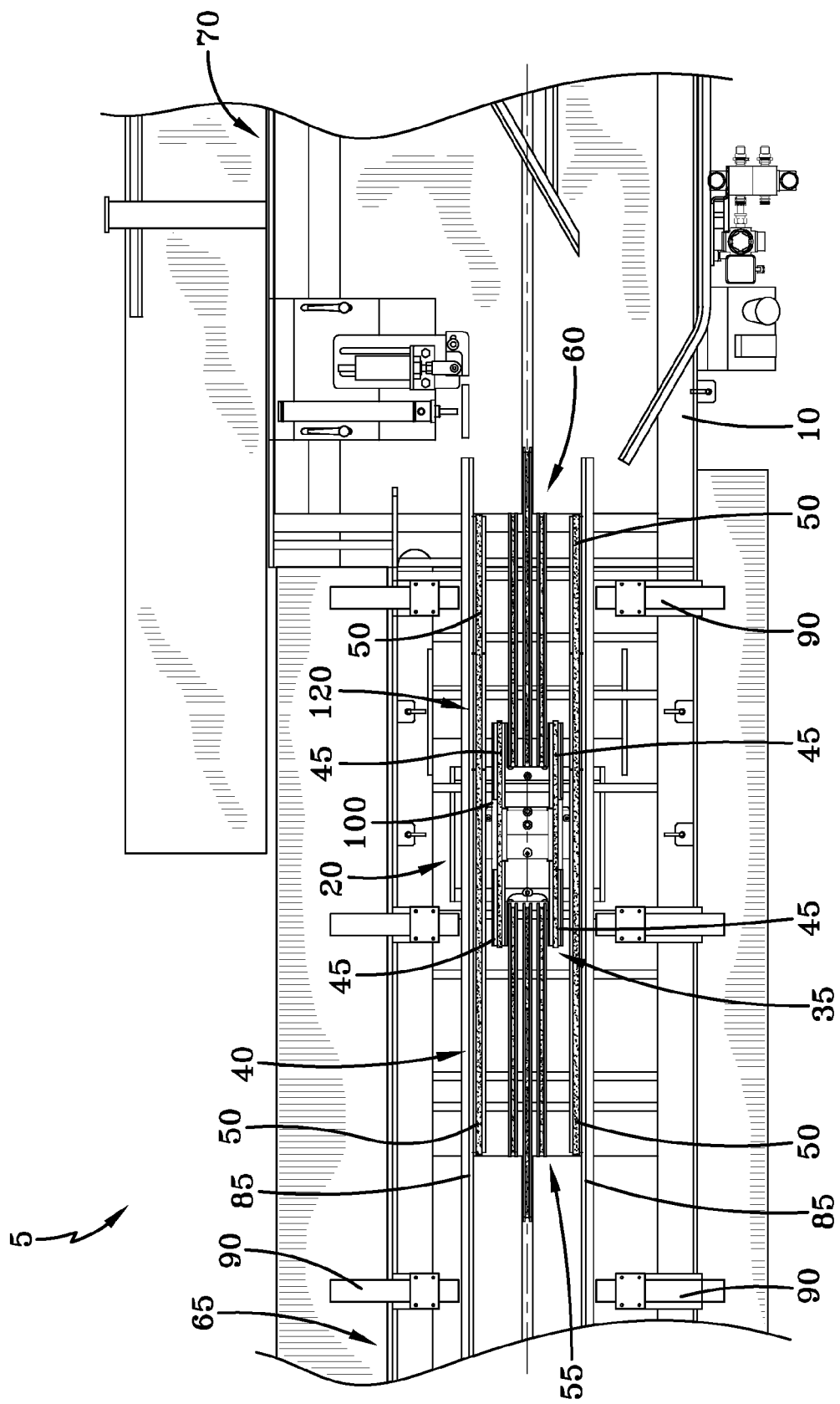
FIG. 1 is a top plan view showing a portion of one exemplary embodiment of a checkweigher of the present invention.
Figure 2:
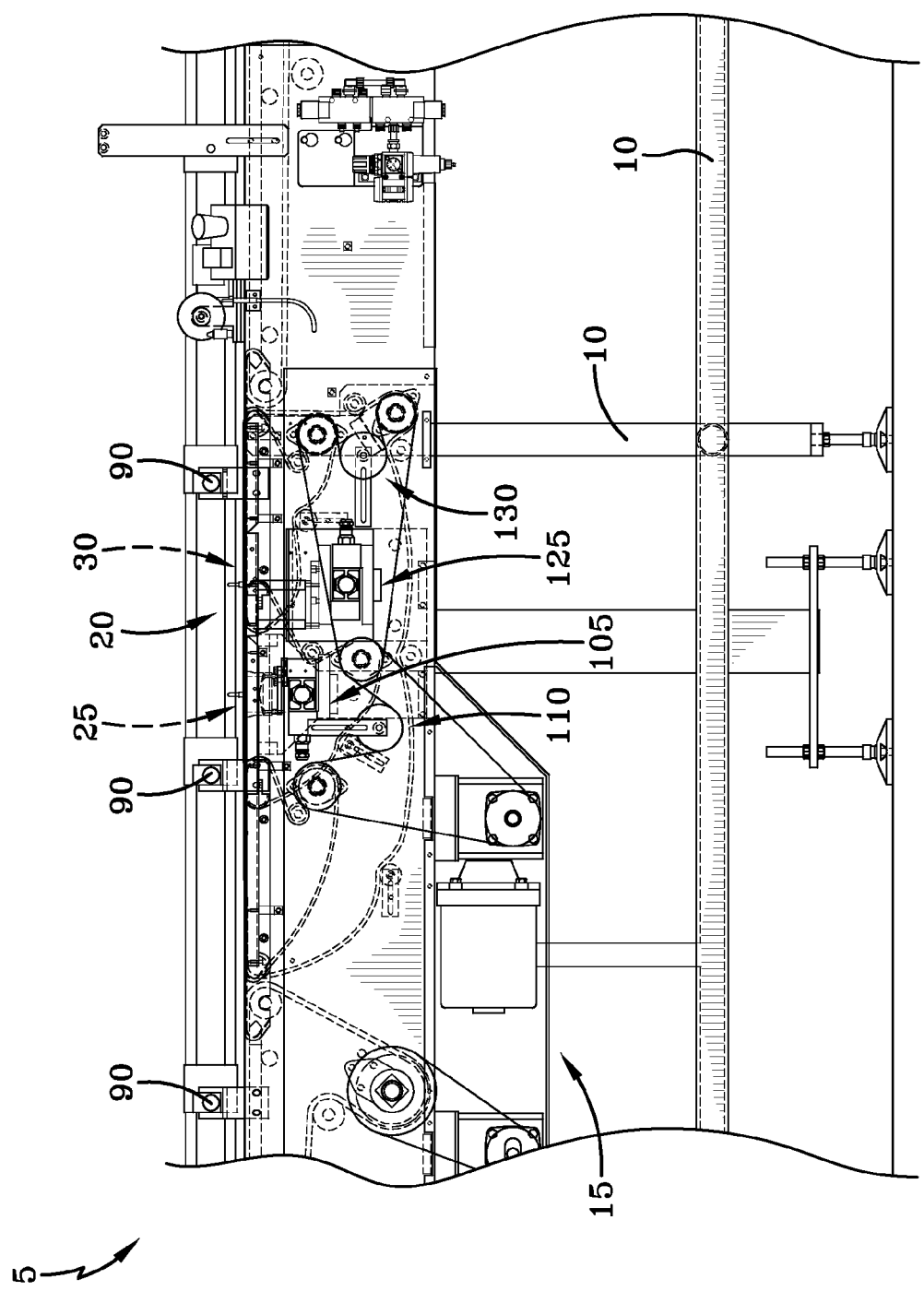
FIG. 2 is a front elevation view of the checkweigher portion shown in FIG. 1.

A portion of one exemplary embodiment of a checkweigher 5 of the present invention is depicted in FIGS. 1-2. As shown, the checkweigher 5 includes a frame 10 and a drive system 15 for passing objects to be weighed through a weighing section 20 of the checkweigher. As would be understood by one of ordinary skill in the art, such a checkweigher may have a variety of frame designs, drive systems, etc. Further, as such items are not critical to the present invention, these items will not be described in detail herein.

Figure 3:
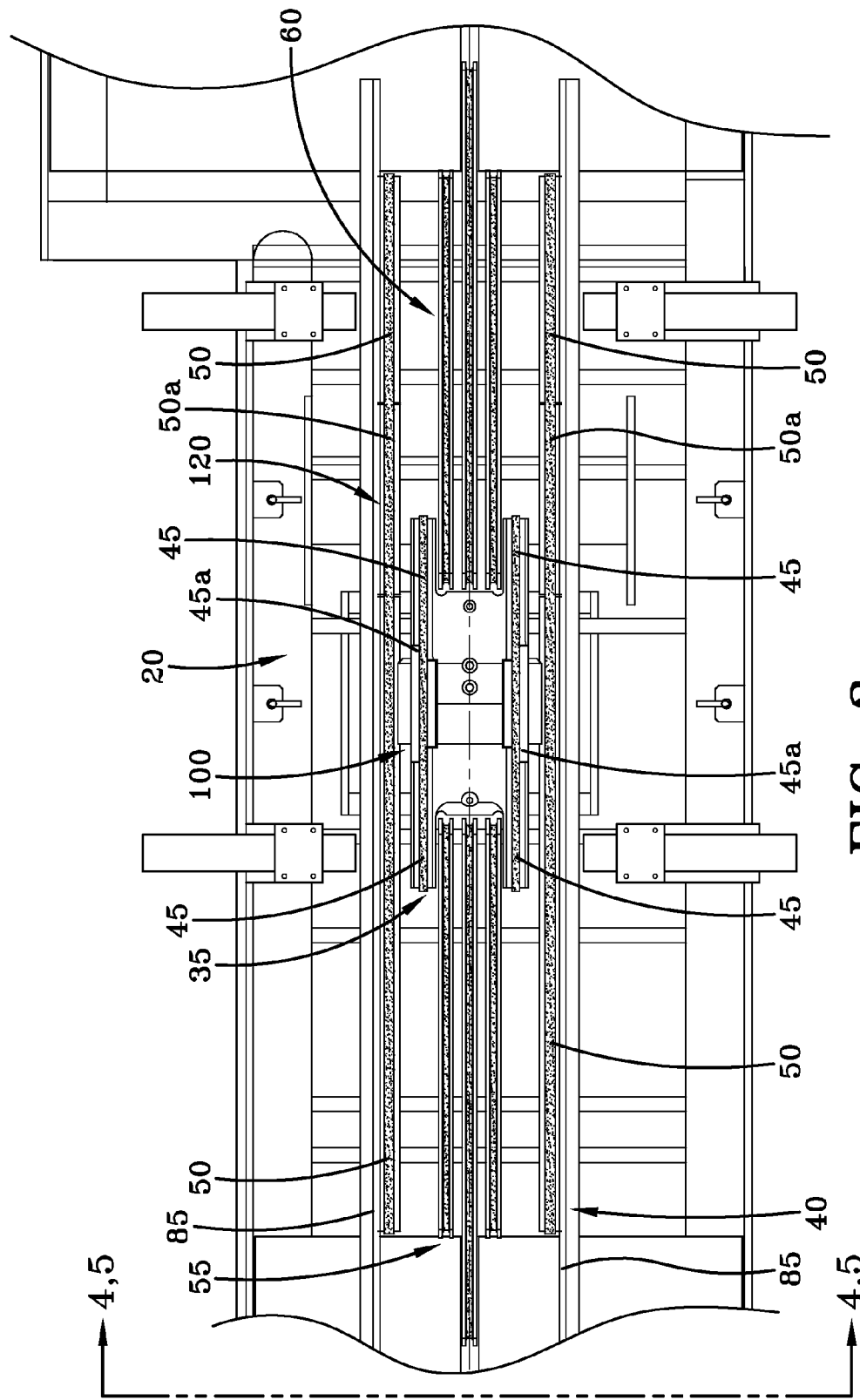
FIG. 3 is an enlarged detail view of a weighing section of the checkweigher as shown in FIG. 1.

As can be observed in FIGS. 1-3, the checkweigher 5 includes a weighing section 20 having first and second scales 25, 30 for weighing smaller/lighter and larger/heavier objects, respectively. Each scale 25, 30 respectively includes a separate weigh pan 100, 120, a separate weighing conveyor 35, 40, a separate weighing conveyor drive 110, 130, and independent weigh cells 105, 125.

The first scale 25 utilizes a weigh pan 100 of a length that is preferably substantially proportional to the size of the objects to be weighed by the first scale. The second scale 30 utilizes a weigh pan 120 of a length that is preferably substantially proportional to the objects to be weighed by the second scale 30. Consequently, in this exemplary embodiment, the weigh pan 120 of the second scale 30 is longer than the weigh pan 100 of the first scale 25.

The weigh pan 100 of the first scale 25 and the weigh pan 120 of the second scale 30 may be respectively associated with a first weigh cell 105 and second weigh cell 125 in any manner known in the art. The weigh cells 105, 125 are activated when an object passes over their associated weigh pans 100, 120 as the object is moved by the associated weighing conveyor 35, 40. More particularly, a weigh pan of a given checkweigher of the present invention is displaced vertically downward when an object to be weighed crosses its surface. This vertical displacement of the weigh pan produces a deflection, compression, etc., of the weigh cell associated with the weigh pan, which causes the weigh cell to produce an output signal indicative of the weight of the object crossing the weigh pan. This general weighing assembly and technique are well known in the art and need not be described in further detail herein. As would also be understood by one of skill in the art, the weigh cells 105, 125 may be comprised of a strain gage based load cell or another acceptable and known displacement measuring device.

As mentioned above, the first scale 25 and second scale 30 are respectively associated with a separate first and second weighing conveyor 35, 40. In this particular exemplary embodiment, each weighing conveyor 35, 40 includes a spaced pair of substantially parallel conveyor elements 45, 50 (e.g., conveyor chains) that transport objects to be weighed over the corresponding scales 25, 30. As can be best observed in FIG. 3, vertically displaceable sections 45a of the conveyor elements 45 of the first weighing conveyor 35 form at least part of the first weigh pan 100. Similarly, vertically displaceable sections 50a of the conveyor elements 50 of the second weighing conveyor 45 form at least part of the second weigh pan 120.

As the first scale 25 of this embodiment is designed to weigh smaller/lighter objects, the conveyor chains 45 of the first conveyor 35 are of a lighter weight construction. Likewise, as the second scale 30 of this embodiment is designed to weigh larger/heavier objects, the conveyor chains 50 of the second weighing conveyor 40 are of are of a heavier construction than the conveyor chains 45 of the first weighing conveyor 35. Each set of weighing conveyors 35, 40 is shown to include a pair of conveyor chains in this exemplary embodiment. It should be realized, however, that a greater number of conveyor chains may be associated with one or both weighing conveyors in other embodiments of the present invention.

In the particular exemplary embodiment shown, the heavier objects to be weighed by the checkweigher 5 are also of larger size (diameter, in this case). Thus, the spacing between the conveyor chains 50 of the second weighing conveyor 40 is greater than the spacing between the conveyor chains 45 of the first weighing conveyor 35. However, the conveyor chains 45, 50 of both weighing conveyors 35, 40 mirror substantially the same conveyor path (centerline). Consequently, objects passing through the weighing section 20 of the checkweigher 5 on either of the weighing conveyors 35, 40 trace substantially the same path from a lateral standpoint, but are transported at a different elevation.

While heavier objects to be weighed by the checkweigher 5 are also of larger size in this particular example, it should be realized that the heavier objects of a given group of objects to be weighed could actually be of smaller size (e.g., diameter) than lighter objects of the group. Consequently, in contrast to the exemplary embodiment shown herein, alternate embodiments of the present invention may be constructed such that a weighing conveyor having conveyor elements with a lesser spacing transports the heavier objects.

Figure 4:
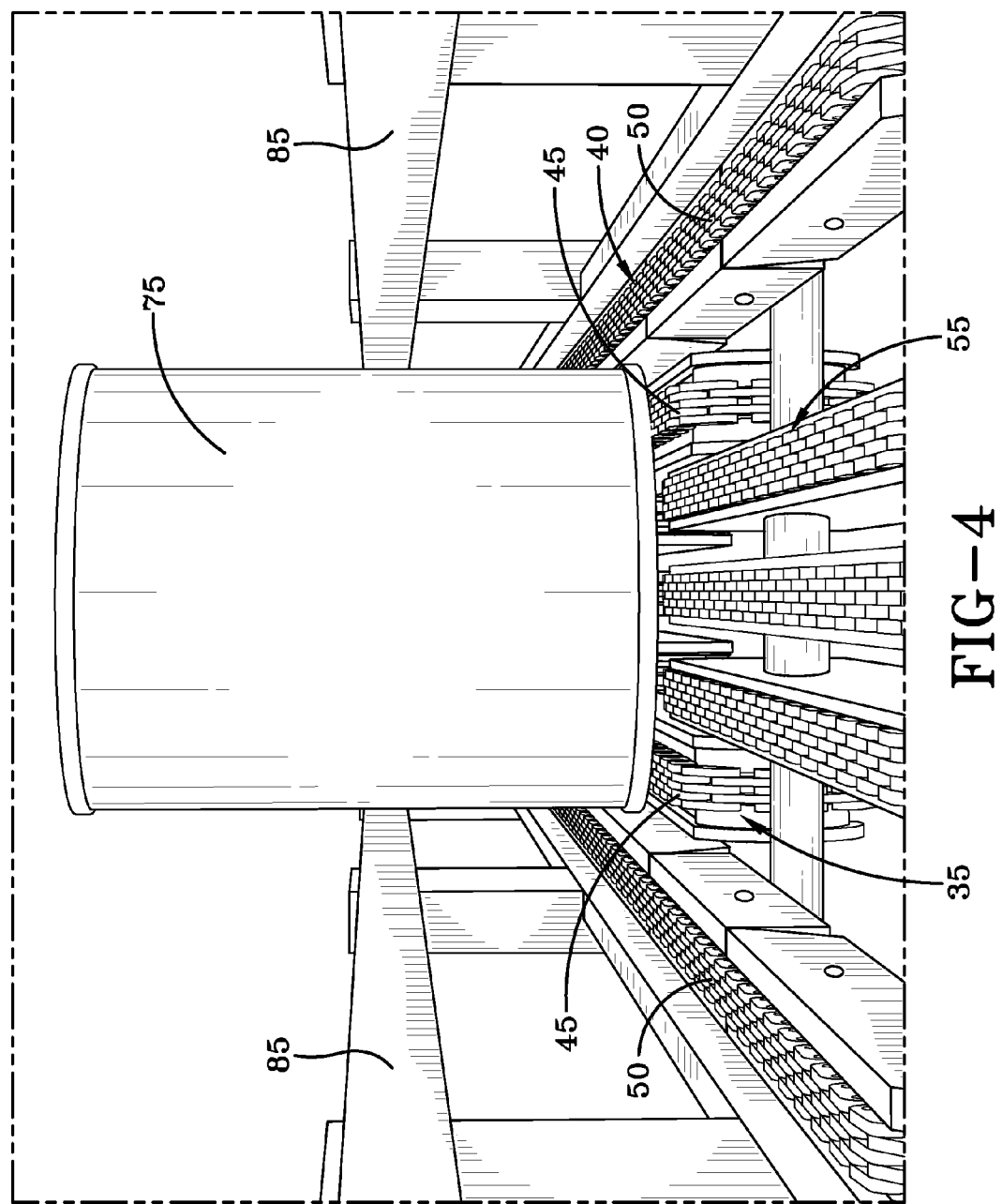
FIG. 4 is an enlarged side elevation view as indicated in FIG. 3, showing an object to be weighed passing over a first scale of the checkweigher on a first set of conveyor chains.
Figure 5:
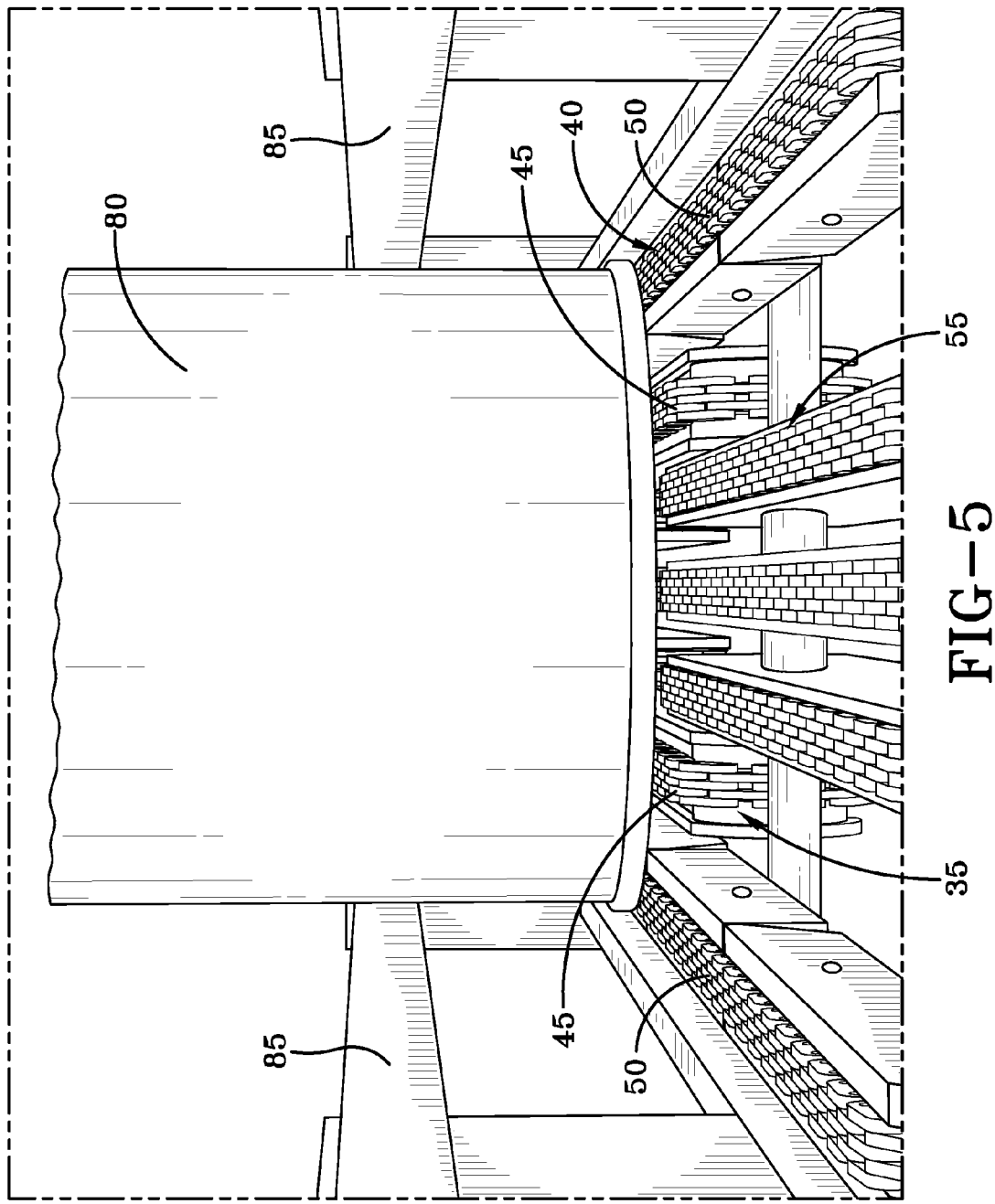
FIG. 5 is an enlarged side elevation view as indicated in FIG. 3, showing an object to be weighed passing over a second scale of the checkweigher on a second set of conveyor chains.

As described in U.S. Pat. No. 5,434,366, each scale 25, 30 preferably, but not necessarily, includes more than one conveyor track so that the conveyor chain centerlines of each weighing conveyor may be adjusted to accommodate objects of varying size. For example, the conveyor chain centerlines of each weighing conveyor 35, 40 may be adjusted to accommodate cans of varying diameter within some predetermined range of diameters (see e.g., FIGS. 4-5). An object of a size too large for the first weighing conveyor 35 of the first scale 25 will be automatically transported to the second scale 30 by the second weighing conveyor 40 (as is described in further detail below).

The weighing section 20 of the checkweigher 5 is also shown to include an in-feed conveyor 55 and a discharge conveyor 60. The in-feed conveyor 55 is provided to transport objects to be weighed from an upstream section 65 of the conveyor line to either the first or second weighing conveyor 35, 40 (depending on the size of the object) of the checkweigher 5. The discharge conveyor 60 is provided to transport objects to be weighed from the weighing section 20 of the checkweigher 5 to a downstream section 70 of the conveyor line. The design of the in-feed and discharge conveyors may vary from embodiment-to-embodiment.

As describe above, the simultaneous operation of two sets of conveyor elements of different weight/size would normally increase noise and decrease the weighing accuracy of a checkweigher. By employing two separate scales, a checkweigher of the present invention eliminates this problem. That is, the noise produced by the conveyor chains of one weighing conveyor will not affect the accuracy of a weighing operation being performed on the scale associated with the other weighing conveyor.

In the exemplary checkweigher 5 shown in the drawing figures, the heavier weight conveyor chains 50 of the second weighing conveyor 40 are located outside of the lighter weight conveyor chains 45 of the first weighing conveyor 35 (although an opposite construction is also possible, as described above). Thus, as can be best observed by reference to FIG. 4, the outwardly located heavier weight conveyor chains 50 of the second weighing conveyor 40 do not support a load when processing objects of smaller size 75. Rather, the smaller sized objects 75 ride along the top of the first weighing conveyor 35 in between the conveyor chains 50 and associated tracks of the second weighing conveyor 40. As such, there is minimal wear associated with running the second weighing conveyor 40 while simultaneously running the first weighing conveyor 35. Therefore, there is no need to remove the heavier weight conveyor chains 50 of the second weighing conveyor 40 as would be normally required when weighing objects on the first scale 25. Nonetheless, an electromechanical clutch or other device could be provided to disable operation of the second weighing conveyor 40 when weighing smaller/lighter objects on the first scale 25.

The design of the checkweigher 5 can be seen to also eliminate the aforementioned problem of larger objects to be weighed simultaneously contacting the conveyor chains 45, 50 of both the first and second weighing conveyors 35, 40 when being transported to and weighed on the second scale 30. As can be best observed in FIGS. 4-5, the conveying surfaces of the conveyor chains 45, 50 associated with the first and second weighing conveyors 35, 40 of the checkweigher 5 are located in different planes for this purpose. As a result, and as can be best observed by reference to FIG. 5, the inwardly located lighter weight conveyor chains 45 of the first weighing conveyor 35 do not support a load when the checkweigher 5 is processing objects of larger size 80. Rather, the larger sized objects 80 ride along the top of the second weighing conveyor 40 while positioned above the conveyor chains 45 of the first weighing conveyor 35. Therefore, there is minimal wear associated with running the first weighing conveyor 35 while simultaneously running the second weighing conveyor 40. Consequently, there is no need to remove the lighter weight conveyor chains 45 of the first weighing conveyor 35 as would be normally required when weighing objects on the second scale 30. Nonetheless, if desired, an electromechanical clutch or other device may be provided to disable operation of the first weighing conveyor when weighing larger objects.

In the exemplary embodiment of the checkweigher 5 shown and described herein, the above-described vertical spacing between the conveyor chains 45, 50 of the first weighing conveyor 35 and the second weighing conveyor 40 is achieved by ramping a portion of the second weighing conveyor upward to a higher elevation than that of the first weighing conveyor 35 and the in-feed and discharge conveyors 55, 60. This higher elevation of the second weighing conveyor 40 can be observed in FIGS. 4-5.

The point at which the second weighing conveyor 40 ramps upward may vary. However, as should be obvious, the in-feed side of the second weighing conveyor 40 preferably ramps up such that objects being transported thereon will not contact the conveyor chains 45 of the in-feed side of the first weighing conveyor 35. Similarly, the point at which the second weighing conveyor 40 ramps back downward may also vary. However, as should also be obvious, the discharge side of the second weighing conveyor 40 preferably ramps back downward such that objects being transported thereon will not contact the conveyor chains 45 of the discharge side of the first weighing conveyor 35. In other words, upward/downward ramping of the second weighing conveyor 40 should occur in a manner that permits objects to be transported thereon through the weighing section 20 of the checkweigher 5 without contacting the conveyor chains 45 of the first weighing conveyor 35.

Figure 6:
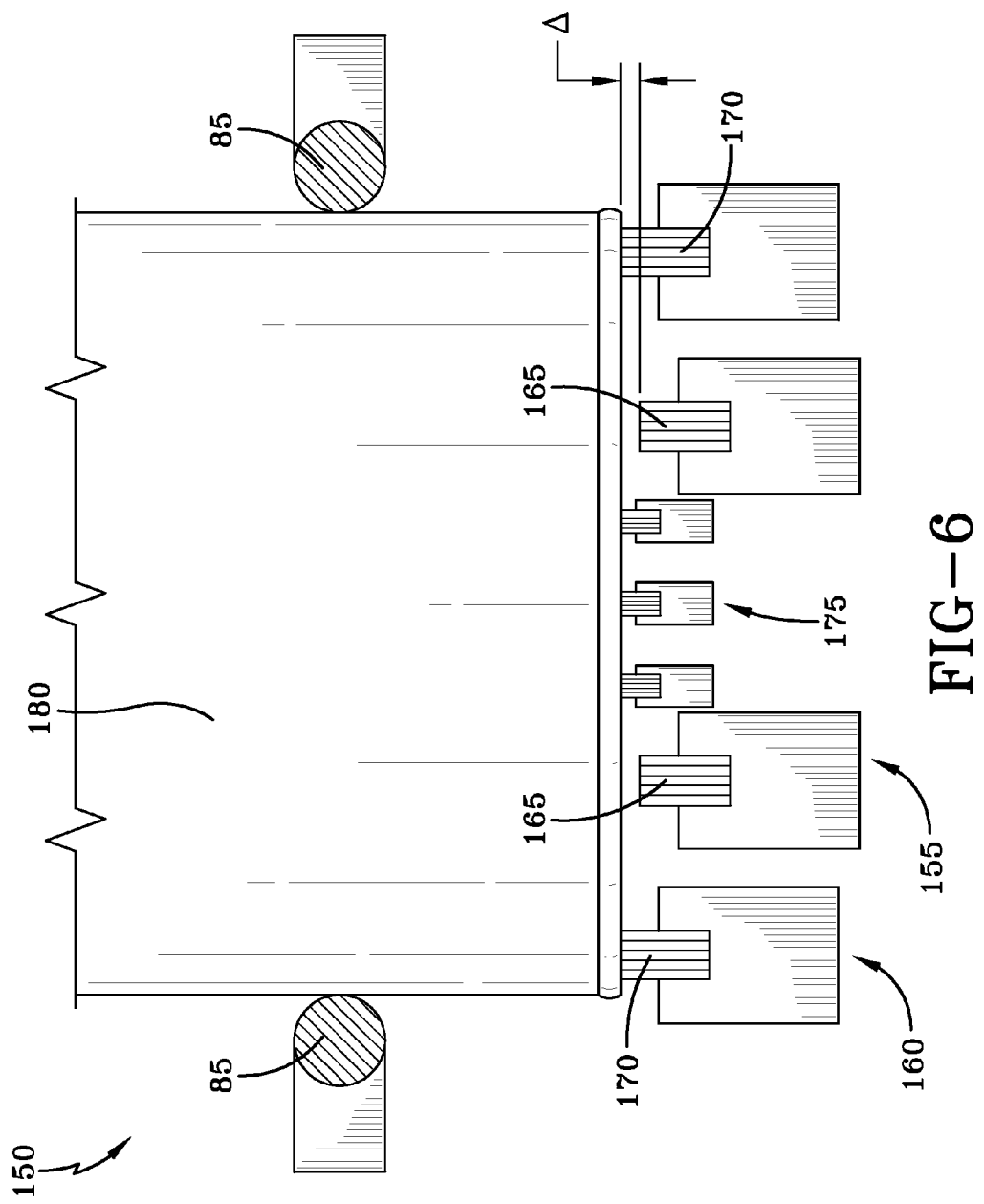
FIG. 6 is a side elevation view depicting an object to be weighed passing over a first scale of an alternative embodiment of a checkweigher of the present invention on a first set of conveyor chains.

An alternate manner of producing a vertical spacing between the conveyor chains 165 of a first weighing conveyor 155 and the conveyor chains 170 of a second weighing conveyor 160 of a checkweigher 150 of the present invention is illustrated in FIG. 6. In this embodiment, the first weighing conveyor 155 for weighing smaller objects ramps downward to a height wherein the conveying surfaces of the conveyor chains 165 thereof is lower than the height of the conveying surfaces of the conveyor chains 170 of the second weighing conveyor 160. As shown, the height of the conveying surfaces of the conveyor chains 165 is also lower than that of the conveying surfaces of an associated in-feed conveyor 175 and discharge conveyor (not visible) in this embodiment. In other versions of such an embodiment, the conveying surfaces of an associated in-feed conveyor and/or discharge conveyor may be at the same height as the conveying surfaces of the first weighing conveyor. In any event, it can be seen that objects 180 transported by the second weighing conveyor 160 will once again pass without contact over the conveyor chains 165 of the first weighing conveyor 155 without the need to upwardly ramp the second weighing conveyor. As a result, contact between objects transported on the second weighing conveyor 160 will once again apply no load to the lighter weight conveyor chains 165 of the first weighing conveyor 155.

One or more guide rails may be employed to properly center objects to be weighed on a checkweigher of the present invention with the scale and associated weighing conveyor that will be utilized in the weighing process. A number of adjustable guide rails 85 are shown to be arranged along the conveyor path of the checkweighers of FIGS. 1-6 for this purpose. The guide rails 85 preferably extend through the weighing section 20 of the checkweigher 5 but, as shown in FIGS. 1-3, may extend beyond the weighing section toward one or both of the upstream and downstream portions 65, 70 of the conveyor line. The guide rails 85 are operative to align and maintain the alignment of the objects to be weighed with the weighing conveyor 35, 40 that will transport the objects across the checkweigher 5.

The guide rails may be associated with locating devices 90, such as digital indicators, that can be used to properly preposition the guide rails for a particular object to be weighed. For example, each object to be weighed may be associated with a locating device position/reading such that the guide rails 85 may be properly located with respect to a given object to be weighed by simply setting the locating devices to a known corresponding position. Such position data may be maintained in a chart, etc. In an alternative embodiment (not shown), the guide rails may be associated with actuators (e.g., electronic, pneumatic, hydraulic, etc.) that can automatically and properly position the guide rails 85 as described above.

It can be understood that by properly centering objects to be weighed using guide rails 85 or another acceptable technique, and by providing a first and second weighing conveyor 35, 40 with dissimilar conveyor element spacing, objects to be weighed will automatically associate with the appropriate weighing conveyor and scale 25, 30. That is, objects having a size (e.g., diameter) that exceeds the maximum size capacity of the first weighing conveyor 35 will be automatically engaged and transported by the second weighing conveyor 40 to the second scale 30. Likewise, objects having a size (e.g., diameter) that is less than the minimum spacing between the conveyor chains 50 of the second weighing conveyor 40 will be automatically engaged and transported by the first weighing conveyor 35 to the first scale 25. The spacing (or range of spacings) between the conveyor elements 45, 50 of the first and second weighing conveyors 35, 40 can be selected to ensure that objects of a given size are always processed by a particular scale 25, 30.

As illustrated by the foregoing description and related drawing figures, providing separate scales accessed by vertically separated conveyor paths allows a single checkweigher to simultaneously operate conveyor elements (e.g., chains) of different weight without interfering with the accuracy of checkweigher weighing operations or causing premature wear to the conveying elements. Thus, a single checkweigher may be used to weigh objects having a size/weight dissimilarity that would typically require the use of separate checkweighers. This results in a savings of both cost and floor space.

While the exemplary checkweigher embodiments described and depicted herein employ two scales and associated weighing conveyors, nothing herein is to be interpreted as so limiting a checkweigher of the present invention. Rather, it would be understood by one of skill in the art that a checkweigher of the present invention could be constructed using more than two scales and associated weighing conveyors by utilizing the same principles described above. Further, while the exemplary checkweigher embodiments described and depicted herein make use of conveyor chains, the use of other types of conveyor elements is also possible (e.g., belts). Therefore, while certain embodiments of the present invention are described in detail above, the scope of the invention is not to be considered limited by such disclosure, and modifications are possible without departing from the spirit of the invention as evidenced by the following claims:

What is claimed is:

1. A checkweigher for use in weighing objects as said objects move along a conveyor, said checkweigher having a weighing section comprising:
   a plurality of scales, each scale having its own weigh pan and associated weigh cell for providing a signal indicative of the weight of an object crossing said weigh pan, and its own pair of spaced apart and substantially parallel driven conveyor elements for transporting objects to be weighed across and in surface engagement with said weigh pan;
   wherein said scales are arranged along a single path through said weighing section, but wherein said weigh pans and associated conveyors are vertically separated and the spacing between said conveyor elements is different for each scale, such that an object transported across one scale will not contact the weigh pan or conveyor of another scale.

2. The checkweigher of claim 1, wherein said conveyor elements are conveyor chains.

3. The checkweigher of claim 1, wherein said conveyor elements are supported by underlying conveyor tracks, and wherein multiple conveyor tracks are provided to allow said conveyor elements to be moved between tracks so as to alter the spacing between conveyor elements to accommodate objects of different size.

4. The checkweigher of claim 1, wherein said conveyor elements of a second conveyor associated with a second scale are spaced farther apart than conveyor elements of a first conveyor associated with a first scale, said conveyor elements of said second conveyor of heavier construction than said conveyor elements of said first conveyor so as to transport larger objects thereon.

5. The checkweigher of claim 4, wherein said conveyor elements of said second conveyor are ramped upward to a higher elevation through said weighing section.

6. The checkweigher of claim 4, wherein said conveyor elements of said first conveyor are ramped downward to a lower elevation through said weighing section.

7. The checkweigher of claim 1, further comprising at least one guide rail for aligning objects to be weighed with said scales as said objects are conveyed thereto.

8. The checkweigher of claim 7, further comprising at least one positioning device associated with said at least one guide rail to alter the position of said at least one guide rail to align objects of different dimension.

9. The checkweigher of claim 1, wherein said weigh pan of each scale is substantially proportional to the size of objects that will be weighed thereon.

10. A checkweigher for use in weighing objects as said objects move along a conveyor, said checkweigher having a weighing section including first and second scales comprising:
    a first vertically deflectable weigh pan and an associated weigh cell to provide a signal indicative of the weight of an object crossing said first weigh pan;
    a first driven weighing conveyor for transporting objects to be weighed across and in surface engagement with said first weigh pan;
    a second vertically deflectable weigh pan and an associated weigh cell to provide a signal indicative of the weight of an object crossing said second weigh pan; and
    a second driven weighing conveyor for transporting objects to be weighed across and in surface engagement with said second weigh pan;
    wherein each weighing conveyor includes spaced apart and substantially parallel driven conveyor chains, and wherein said conveyor chains of said second weighing conveyor reside farther apart than said conveyor chains of said first weighing conveyor; and
    wherein said first weighing conveyor and said second weighing conveyor are adapted to transport objects along substantially the same path through said weighing section, but with said objects carried therethrough at different elevations by each weighing conveyor such that an object transported by said second weighing conveyor will not contact the weigh pan or conveyor associated with said first weighing conveyor.

11. The checkweigher of claim 10, wherein said conveyor chains are supported by underlying conveyor tracks, and wherein multiple conveyor tracks are provided to allow said conveyor chains to be moved between tracks so as to alter the spacing between conveyor chains to accommodate objects of different size.

12. The checkweigher of claim 10, wherein said conveyor chains of said second conveyor are of heavier construction than said conveyor chains of said first conveyor so as to transport larger objects thereon.

13. The checkweigher of claim 10, wherein said conveyor chains of said second conveyor are ramped upward to a higher elevation through said weighing section.

14. The checkweigher of claim 10, wherein said conveyor chains of said first conveyor are ramped downward to a lower elevation through said weighing section.

15. The checkweigher of claim 10, further comprising at least one guide rail for aligning objects to be weighed with said scales as said objects are conveyed thereto, at least one positioning device associated with said at least one guide rail to alter the position of said at least one guide rail to align objects of different dimension.

16. The checkweigher of claim 10, wherein said weigh pan of each scale is substantially proportional to the size of objects that will be weighed thereon.

17. A checkweigher for use in weighing objects as said objects move along a conveyor, said checkweigher having a weighing section comprising:
    a first scale, said first scale having a vertically deflectable weigh pan and an associated weigh cell to provide a signal indicative of the weight of an object crossing said weigh pan, and a first weighing conveyor including a pair of spaced apart and substantially parallel driven conveyor chains for transporting objects to be weighed across and in surface engagement with said weigh pan of said first scale;
    a second scale, said second scale having a vertically deflectable weigh pan and an associated weigh cell to provide a signal indicative of the weight of an object crossing said weigh pan, and a second weighing conveyor including a pair of spaced apart and substantially parallel driven conveyor chains for transporting objects to be weighed across and in surface engagement with said weigh pan of said second scale, said conveyor chains of said second weighing conveyor being of heavier construction than said conveyor chains of said first weighing conveyor, and the distance between said conveyor chains of said second weighing conveyor being greater than the distance between said conveyor chains of said first weighing conveyor; and
    at least one adjustable position guide rail for aligning objects to be weighed with said scales as said objects are conveyed thereto
    wherein said first scale is provided to weigh objects of a smaller size than those to be weighed by said second scale; and
    wherein said first weighing conveyor and said second weighing conveyor are adapted to transport objects along substantially the same path through said weighing section, but wherein said weigh pan and conveyor elements of said second scale are located at a higher elevation than said weigh pan and conveyor elements of said first scale such that an object transported across said second scale will not contact the weigh pan or conveyor associated with said first scale; and
    wherein both said first weighing conveyor and said second weighing conveyor may be operated simultaneously without affecting the accuracy of the other scale.

18. The checkweigher of claim 17, wherein said conveyor chains are supported by underlying conveyor tracks, and wherein multiple conveyor tracks are provided to allow said conveyor chains to be moved between tracks so as to alter the spacing between conveyor chains to accommodate objects of different size.

19. The checkweigher of claim 17, wherein said conveyor chains of said second conveyor are ramped upward to a higher elevation through said weighing section.

20. The checkweigher of claim 17, wherein said conveyor chains of said first conveyor are ramped downward to a lower elevation through said weighing section.

21. The checkweigher of claim 17, wherein said weigh pan of each scale is substantially proportional to the size of objects that will be weighed thereon.

22. A checkweigher for use in weighing objects as said objects move along a conveyor, said checkweigher having a weighing section comprising:
    a plurality of scales, each scale having its own weigh pan and associated weigh cell for providing a signal indicative of the weight of an object crossing said weigh pan, and its own driven conveyor for transporting objects to be weighed across and in surface engagement with said weigh pan;

at least one guide rail for aligning objects to be weighed with said scales as said objects are conveyed thereto; and at least one positioning device associated with said at least one guide rail to alter the position of said at least one guide rail to align objects of different dimension;

wherein said scales are arranged along a single path through said weighing section, but wherein said weigh pans and associated conveyors are vertically separated such that an object transported across one scale will not contact the weigh pan or conveyor of another scale.

23. A checkweigher for use in weighing objects of dissimilar size as said objects move along a conveyor, said checkweigher having a weighing section comprising:

a first scale and a second scale, each scale having its own weigh pan and associated weigh cell for providing a signal indicative of the weight of an object crossing said weigh pan, and its own driven conveyor with spaced apart conveyor elements for transporting objects to be weighed across and in surface engagement with said weigh pan;

wherein said scales and their respective conveyors are arranged along a single path through said weighing section, but with said weigh pans of each scale residing at different elevations such that an object transported across one scale will not contact the weigh pan or conveyor of the other scale, and wherein the scale to which an object is directed is based solely on the footprint of the object and the spacing of the conveyor elements.

* * * * *